(12) United States Patent
Burns, Jr. et al.

(10) Patent No.: US 7,454,841 B2
(45) Date of Patent: Nov. 25, 2008

(54) METHOD AND APPARATUS FOR WHEEL ALIGNMENT SYSTEM TARGET PROJECTION AND ILLUMINATION

(75) Inventors: Leigh R. Burns, Jr., Troy, IL (US); Daniel R. Dorrance, Ballwin, MO (US); Nicholas J. Colarelli, III, St. Louis, MO (US); Timothy A. Strege, Sunset Hills, MO (US); Gerald E. Friton, Chesterfield, MO (US); Mark S. Shylanski, University City, MO (US); David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/555,047

(22) Filed: Oct. 31, 2006

(65) Prior Publication Data

US 2007/0124949 A1 Jun. 7, 2007

Related U.S. Application Data

(60) Provisional application No. 60/732,003, filed on Nov. 1, 2005.

(51) Int. Cl.
*G01B 11/275* (2006.01)
(52) U.S. Cl. .................. 33/288; 33/203.18; 356/139.09
(58) Field of Classification Search .................. 33/288, 33/203.18
See application file for complete search history.

(56) References Cited

U.S. PATENT DOCUMENTS

| | | | | |
|---|---|---|---|---|
| 2,641,957 A | * | 6/1953 | Vandermeer | ................ 356/155 |
| 3,288,020 A | * | 11/1966 | Lill | ............................ 356/155 |
| 3,501,240 A | * | 3/1970 | Haynes | ...................... 356/155 |
| 4,899,218 A | | 2/1990 | Waldecker et al. | |
| 5,243,766 A | * | 9/1993 | Marley et al. | ................. 33/288 |
| 5,535,522 A | | 7/1996 | Jackson | |
| 5,675,515 A | | 10/1997 | January | |
| 5,724,129 A | | 3/1998 | Matteucci | |
| 5,731,870 A | | 3/1998 | Bartko et al. | |
| 5,818,574 A | | 10/1998 | Jones et al. | |
| 5,978,077 A | | 11/1999 | Koerner et al. | |
| 6,151,562 A | | 11/2000 | Merrill | |
| 6,341,013 B1 | | 1/2002 | Battiti et al. | |
| 6,397,164 B1 | | 5/2002 | Nobis et al. | |
| 6,404,486 B1 | | 6/2002 | Nobis et al. | |
| 6,545,750 B2 | | 4/2003 | Roth et al. | |
| 6,559,936 B1 | | 5/2003 | Colombo et al. | |

(Continued)

FOREIGN PATENT DOCUMENTS

FR 2808082 10/2001

*Primary Examiner*—Christopher W Fulton
(74) *Attorney, Agent, or Firm*—Polster, Lieder, Woodruff & Lucchesi, L.C.

(57) ABSTRACT

A machine vision vehicle wheel alignment system configured with at least one cameras for acquiring images of the wheels of a vehicle, and an associated light projectors configured to project a pattern image onto the surfaces of vehicle components such as vehicle wheel assemblies. Images of the projected patterns acquired by the camera, are processed by the vehicle wheel alignment system to facilitate a determination of the relative orientation and position of the surfaces such as wheel assemblies in three dimensional space, from which vehicle parameters such as wheel alignment measurements can be subsequently determined.

27 Claims, 10 Drawing Sheets

U.S. PATENT DOCUMENTS

| | | |
|---|---|---|
| 6,657,711 B1 | 12/2003 | Kitagawa et al. |
| 6,690,456 B2 * | 2/2004 | Bux et al. .............. 356/139.09 |
| 6,691,062 B1 | 2/2004 | Nobis |
| 6,710,866 B1 | 3/2004 | Adolph |
| 6,748,796 B1 * | 6/2004 | Van Den Bossche ....... 73/118.1 |
| 6,894,771 B1 | 5/2005 | Dorrance et al. |
| 7,230,694 B2 | 6/2007 | Forster |
| 7,302,093 B2 | 11/2007 | Dorrance et al. |
| 2005/0001991 A1 * | 1/2005 | Ulichney et al. .............. 353/69 |
| 2005/0030525 A1 | 2/2005 | Forster et al. |
| 2005/0068522 A1 | 3/2005 | Dorrance et al. |
| 2006/0042380 A1 | 3/2006 | Douglas et al. |

\* cited by examiner

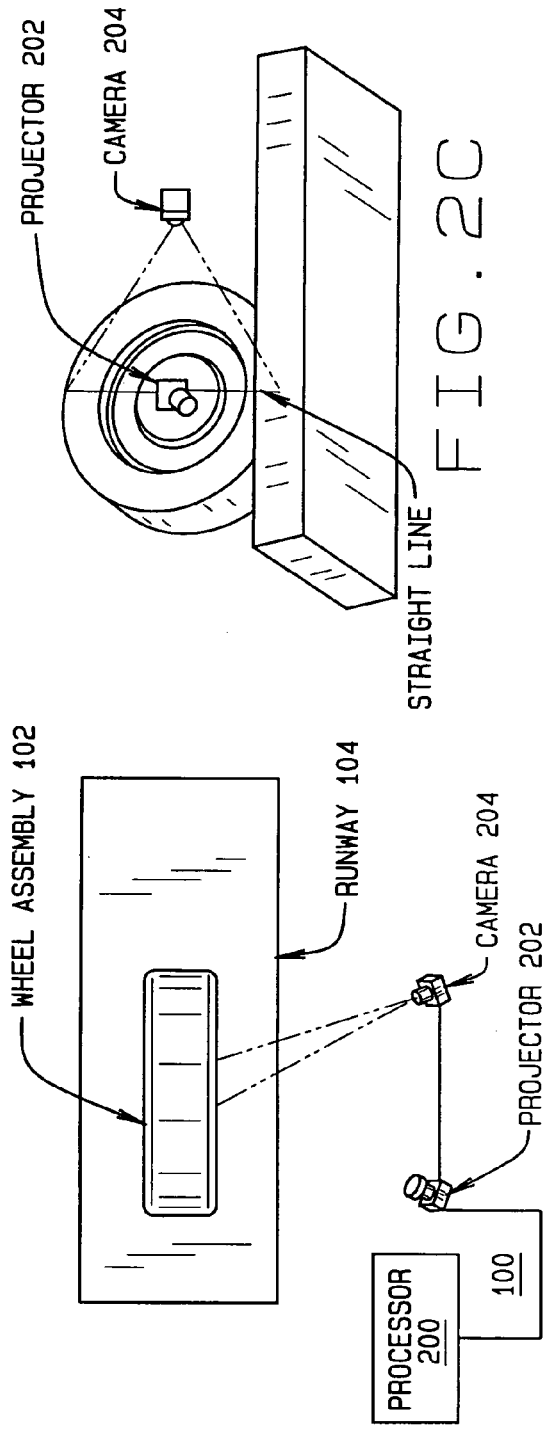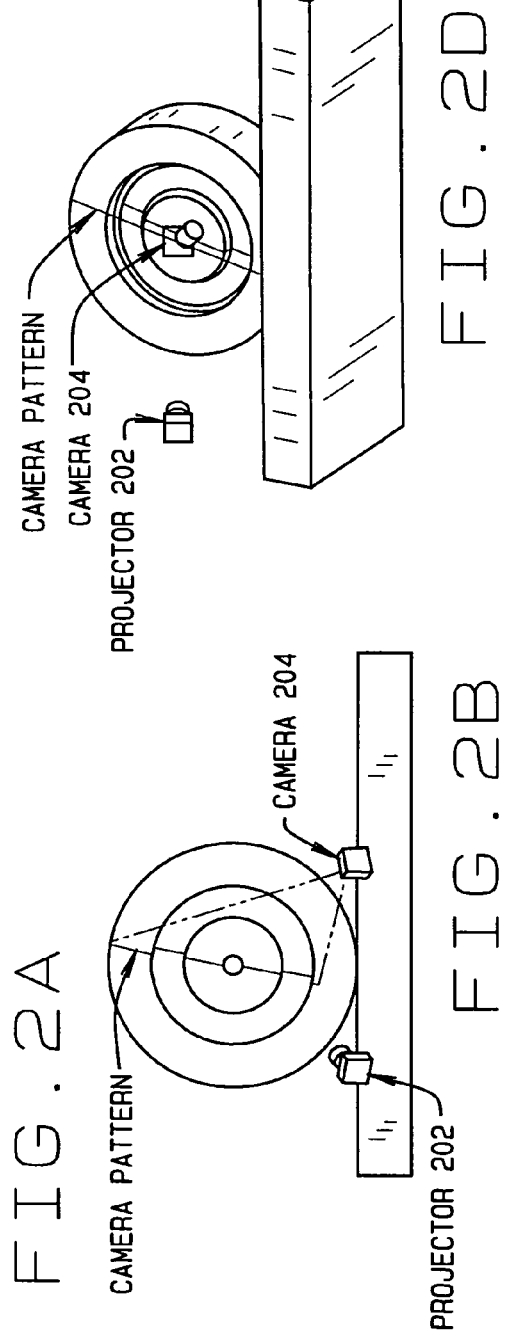

METHOD AND APPARATUS FOR WHEEL ALIGNMENT SYSTEM TARGET PROJECTION AND ILLUMINATION

CROSS-REFERENCE TO RELATED APPLICATIONS

The present application is related to, and claims priority from, U.S. Provisional Patent Application Ser. No. 60/732,003 which was filed on Nov. 1, 2005, and which is herein incorporated by reference.

STATEMENT REGARDING FEDERALLY SPONSORED RESEARCH

Not Applicable.

BACKGROUND OF THE INVENTION

The present invention is related to machine vision vehicle wheel alignment systems configured to view an optical target associated with a vehicle wheel to determine vehicle wheel alignment angles, and in particular, to a machine vision vehicle wheel alignment system which includes an optical projection system adapted to project a target pattern onto a vehicle wheel to aid in the determination of vehicle wheel alignment angles.

Conventional machine vision wheel alignment systems such as shown in U.S. Pat. No. 5,535,522 to Jackson and in U.S. Pat. No. 5,675,515 to January use predefined target structures which are physically mounted to the wheels of a vehicle. The purpose of these target structures is to provide a very accurately known fixed pattern on a stable surface so that the physical target position, relative to the observing camera, can be determined by analysis of the acquired images. Rolling of the vehicle with the physical targets secured to the vehicle wheels, allows the vehicle wheel alignment system to calculate the target position(s) with respect to the wheel(s) axis of rotation. Subsequent coordinate transformations establish the individual wheel positions in a common coordinate system, from which vehicle alignment angles may be determined.

Those of ordinary skill in the art of vehicle wheel alignment will recognize that the accuracy of the alignment angle measurements determined from images of physical target structures depends upon the precision of the target image analysis and proper compensation for the physical target location with respect to the axis of rotation of the associated vehicle wheels. In normal use, physical target patterns and structures may become corrupted by greasy handprints and damage from impact or abrasion with sharp objects. Image analysis software utilized by traditional machine-vision vehicle wheel alignment systems has some tolerance for corrupted target patterns, and will provide accurate measurements so long as these thresholds are not exceeded. When an image of a physical target can no longer be analyzed by the vehicle wheel alignment system, a technician must stop the alignment process, investigate the cause, and take corrective action. Most often only a thorough cleaning is required, but in severe cases the physical target must be replaced. Regardless of the cause, time is lost and efficiency decreased.

Another disadvantage to using physical target structures is apparent when the target structures are required to be mounted on the vehicle wheels, and lies in the use of a wheel adapter to secure the target to the wheel. Wheel adapters can be clumsy and time consuming to apply. If the wheel adapter is not properly secured to the wheel, or the target structure is not properly secured to the wheel adapter, the target structure can fall off or shift position during a compensation procedure resulting in lost time or erroneous alignment angle measurements. The technician may not know or suspect one of the alignment angles was improperly measured unless the error was very large and would likely attempt to correct the "bad" angle as a normal part of the alignment service, unwittingly introducing misalignment into the vehicle. These conditions may or may not be discovered during a subsequent road test of the vehicle following the alignment procedures.

Generally, machine vision vehicle wheel alignment systems requiring physical target structures and wheel adapters are not forgiving to corruption of the target patterns or adapter mounting errors. It takes time and money to properly maintain these items and they are expensive to replace if damaged beyond repair.

Accordingly, a machine vision vehicle wheel alignment system which does not require physical target structures or wheel adapters to be mounted to vehicle wheels would be desirable. Target cleaning and maintenance requirements could be eliminated, and problems with wheel adapter mounting errors would not be an issue. By eliminating physical target structures, the time required to initially secure wheel adapters to the vehicle wheels is no longer part of the alignment process, and shorter alignment procedure cycles can be achieved.

Additional advantages may be obtained by providing a machine vision vehicle wheel alignment system which does not rely upon a complex arrangement of mirrors, cameras, or lasers, and which does not require any physical markings or adhesive targets to be placed on a vehicle wheel assembly prior to beginning a vehicle wheel alignment procedure.

BRIEF SUMMARY OF THE INVENTION

Briefly stated, the present invention provides a machine vision vehicle wheel alignment system with a means to determine vehicle wheel alignment. The system of the present invention employs a set of cameras for acquiring images of the wheels of a vehicle, and an associated set of light projectors configured to project a target pattern image onto the surfaces of each vehicle wheel assembly. Images of the target patterns acquired by the cameras, are processed by the vehicle wheel alignment system to determine the relative orientation and position of the wheel assemblies in three dimensional space, from which vehicle wheel alignment angles can be subsequently determined.

The foregoing features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2A is a top plan view of a first embodiment of the present invention configured with a single cameras and a light projector at a first orientation relative to a vehicle wheel;

FIG. 2B is a side plan view of the embodiment shown in FIG. 2A;

FIG. 2C is a lower perspective view of the embodiment shown in FIG. 2A;

FIG. 2D is an upper perspective view of the embodiment shown in FIG. 2A;

Corresponding reference numerals indicate corresponding parts throughout the several figures of the drawings. It is to be understood that the drawings are for illustrating the concepts of the invention and are not to scale.

DESCRIPTION OF THE PREFERRED EMBODIMENT

Figure 1A:
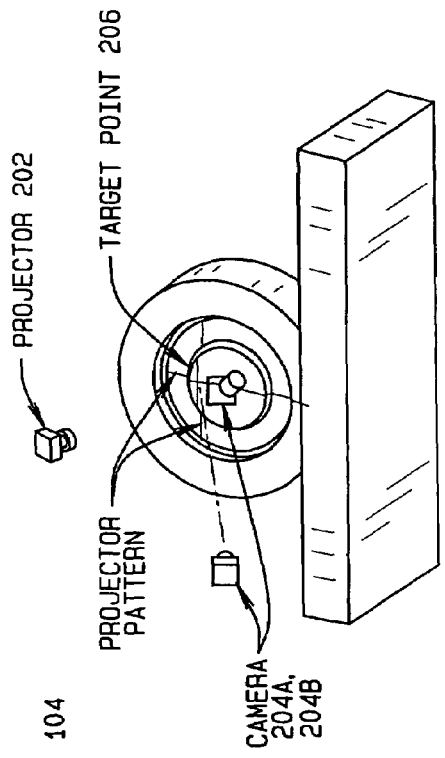
FIG. 1A is a top plan view of a first embodiment of the present invention configured with a pair of cameras and a light projector.
Figure 1C:
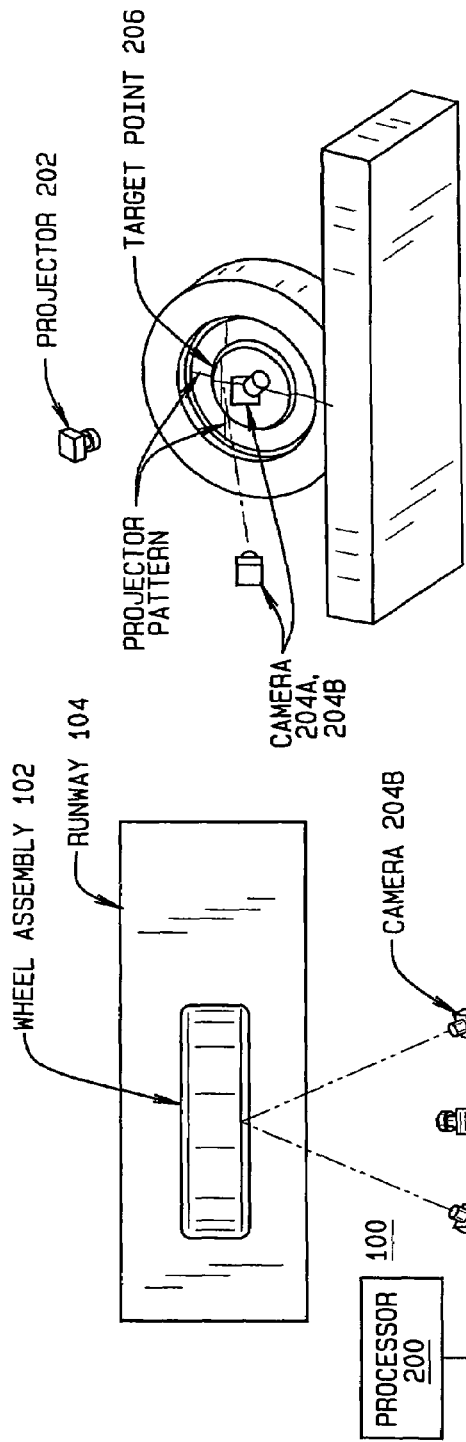
FIG. 1C is a lower perspective view of the embodiment shown in FIG. 1A.
Figure 1B:
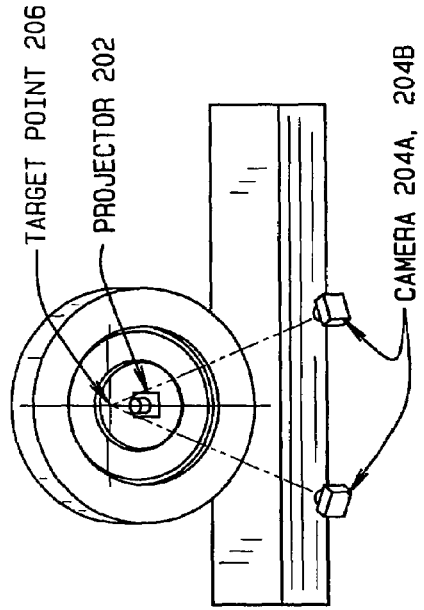
FIG. 1B is a side plan view of the embodiment shown in FIG. 1A.
Figure 1D:
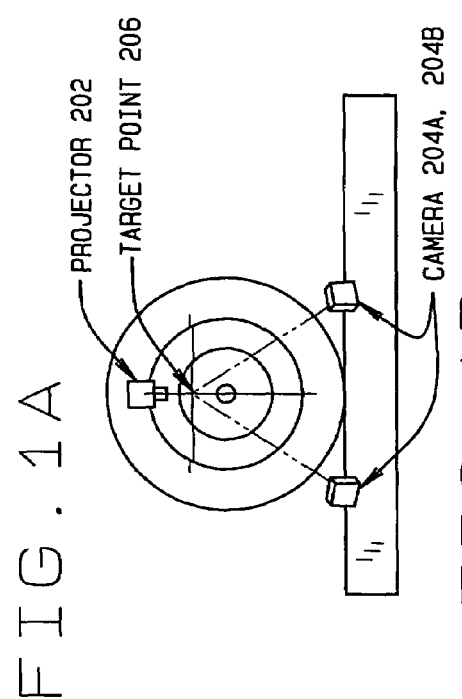
FIG. 1D is an upper perspective view of the embodiment shown in FIG. 1A.
Figure 3A:
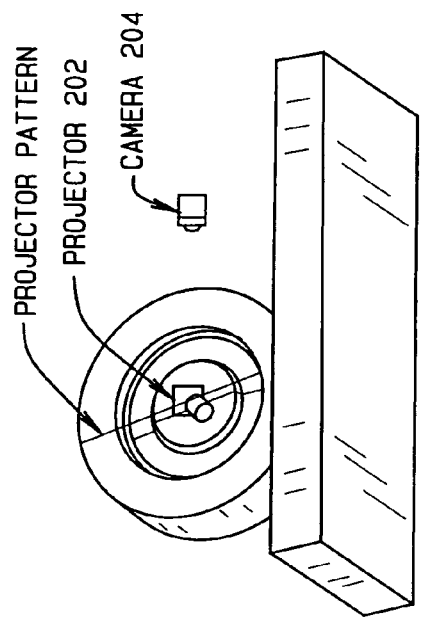
FIG. 3A is a top plan view of a first embodiment of the present invention configured with a single camera and a light projector at a second orientation relative to a vehicle wheel.
Figure 3B:
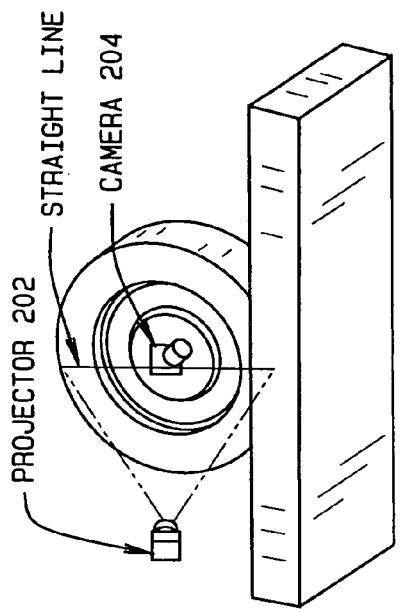
FIG. 3B is a side plan view of the embodiment shown in FIG. 3A.
Figure 3C:
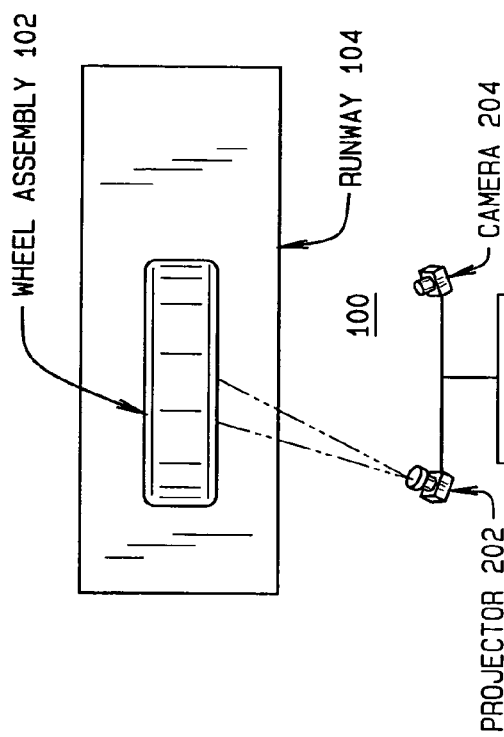
FIG. 3C is a lower perspective view of the embodiment shown in FIG. 3A.
Figure 3D:
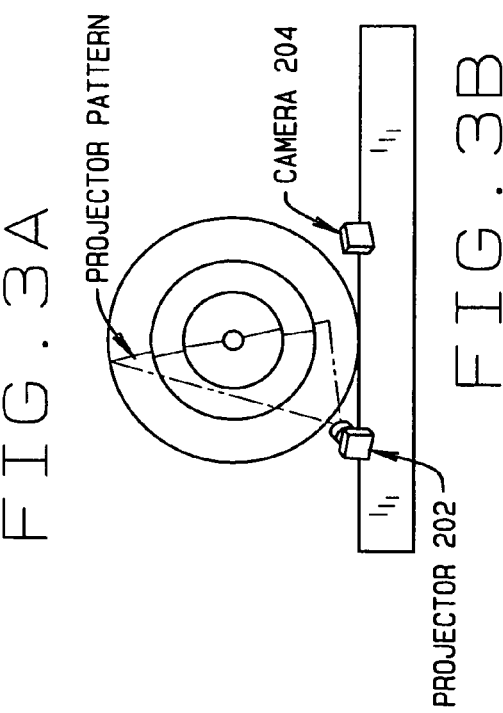
FIG. 3D is an upper perspective view of the embodiment shown in FIG. 3A.

The following detailed description illustrates the invention by way of example and not by way of limitation. The description enables one skilled in the art to make and use the invention, and describes several embodiments, adaptations, variations, alternatives, and uses of the invention, including what is presently believed to be the best mode of carrying out the invention.

Turning to the Figures, and to FIGS. 1A-1D, 2A-2D, and 3A-3D in particular, components of a machine vision vehicle wheel alignment system 100 are shown in proximity to a single vehicle wheel assembly 102 disposed on a supporting surface, lift rack, or runway 104. Those of ordinary skill will recognize that the components of the vehicle wheel alignment system 100 described are understood to be duplicated where necessary for purposes of acquiring vehicle wheel alignment measurements from multiple wheel assemblies of a vehicle undergoing a vehicle wheel alignment service procedure, and that the configurations shown in the Figures are simplified for purposes of describing the operation of the present invention in the context of a single vehicle wheel assembly 102.

As will be described below in more detail, the vehicle wheel alignment system 100 of the present invention includes a processing system 200, which consists generally of a processor or logic circuit and supporting components, such as a memory, configured with software applications for conducting vehicle wheel alignment procedures and for image processing. The processing system 200 is operatively coupled to at least one light projector 202 and to one or more cameras 204 associated with the light projector 202. The cameras 204 have a field of view which preferably includes at least a portion of the field of projection for the light projector 202. As stated above, those of ordinary skill in the art will recognize that the processing system 200 may be operatively coupled to multiple projectors 200 and associated cameras 204 as may be required to obtain images of each wheel assembly or portion of a vehicle undergoing a vehicle service procedure.

Preferably, the light projector 202 is a light projector capable of projecting monochrome or color images with fixed or dynamically alterable patterns of arbitrary color, shape, size and position. The patterns preferably include a plurality of identifiable features, such as geometric shapes having edges and a plurality of vertex points (polygons), geometric shapes having no vertex points (ellipses), straight or curvilinear lines defining edges, or any other feature which includes distinct components. The light projector 202 is controlled by the processing system 200 in conjunction with the cameras 204 to overcome the disadvantages of prior art vehicle wheel systems by eliminating the need for a physical target structure and a supporting wheel adapter to be mounted to the vehicle wheel assembly 102, vehicle structure (not shown), or onto the vehicle support surface such as the runway or lift rack (not shown). The flexibility of the light projector 202 to project a wide range of images onto a surface of the vehicle wheel assembly 102 provides a wide variety of possibilities for wheel alignment applications. Generally, suitable light projectors 202 utilize a flat panel liquid crystal display (LCD), digital light projection (DLP), or a laser projection display (LPD) to project an image onto the surface of a vehicle wheel assembly 102.

In general, the light projector 202 is a programmable illumination source capable of projecting light to form, on a surface, images which range from an all white projection similar to a floodlight, to intricate special purpose, changing patterns. A projected pattern or color can be tailored to occupy all or part of the fields of view of any associated cameras 204 disposed to view the projected images. Projected light or patterns may be steered to different parts of the fields of view of the cameras 204, and moved with varying speeds by controlling the operation of the light projector 202. Within the field of view of a projected pattern, the illumination intensity may be varied to contain gradients or dark areas, as may be required to control reflections or highlight features of interest on the surface.

In a first embodiment of the present invention, illustrated in FIGS. 1A-1D, a pair of cameras 204A and 204B are utilized in a stereo imaging configuration in conjunction with a light projector 202. The stereo cameras 204A and 204B, and the light projector 202 are calibrated so that a mathematical transformation from each of the components to a selected point is known. Preferably, this transformation is determined as part of a calibration procedure. While shown in association with a single vehicle wheel assembly 102, it will be recognized that the configuration of cameras 204 and light projector 202 is repeated at each vehicle wheel assembly location. Accurate stereo camera systems require the two cameras 204A and 204B to triangulate on the same target point 206 on the object. However, the target point 206 may appear slightly different in the two images acquired by the pair of cameras 204A, 204B due to the different camera perspectives and illumination conditions. The subtle difference in appearance of the target point 206 from image to image can cause conventional imaging systems to misidentify corresponding points and generate erroneous coordinates for the location of the target point 206 in three-dimensional space.

In one embodiment of the present invention, misidentification of the target point 206 in a stereo imaging configuration is overcome by projecting a distinctive light pattern onto the surfaces of the vehicle wheel assembly 102 using the light projector 202. The projected pattern preferably contains easily recognizable features, such as geometric components having identifiable vertex points, i.e., the corners of squares or the intersections of lines, which may be precisely resolved by the processing system 200 using standard algorithms such as SIFT. By processing an image of the projected pattern acquired by each of the cameras 204A and 204B, the processing system 200 can establish a common reference system for identifying the location of the target point 206.

Figure 4:
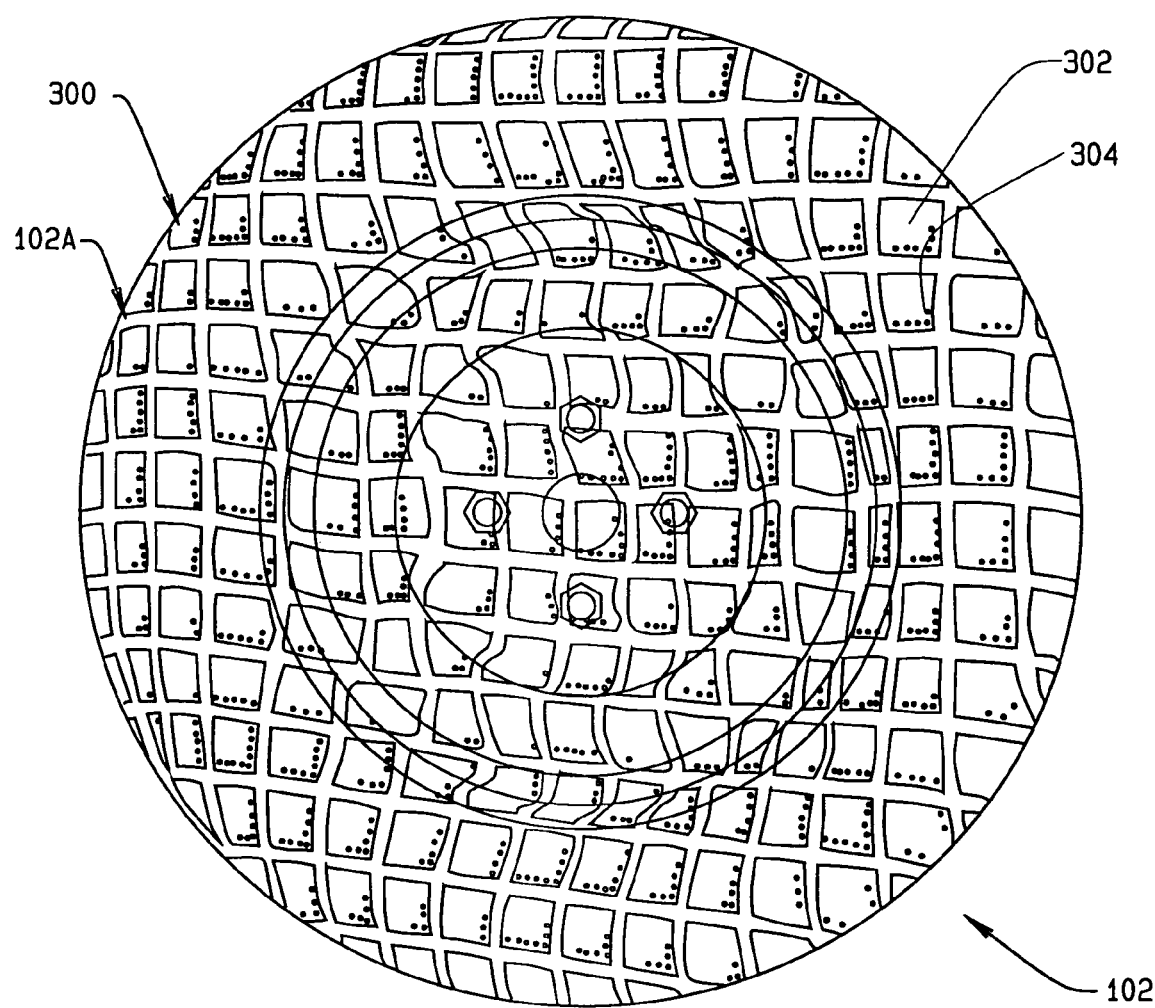
FIG. 4 is a perspective view of a vehicle wheel assembly surface onto which a pattern of coded squares has been projected.

To facilitate matching of an image acquired by one camera 204A with the image acquired by the second cameras 204B, it is preferable to provide an identifying code or pattern within the projected image. Inclusion of a code or pattern will put a lower limit on the size of the projected feature. For example, as shown in FIG. 4, a projected image 300 on the surface 102A of a vehicle wheel assembly 102 may consist of a pattern of squares 302 within which is a coded sequence consisting of rows and columns of dots 304. The specific arrangement of the dots assists in identifying the individual squares 302 in the projected image 300. It is desirable to provide a sufficient number of individual squares 302 in the projected image 300 for the processor 200 to obtain a dense point cloud of data points during image processing, however, the number of squares 302 may be limited by their size. If the squares 302 are too big to provide the desired point cloud density using a single projected image 300, the processor 200 can direct the light projector 202 to alter the projected pattern by a fraction of a square 302, either by moving the location of the projected image 300 and/or changing the size of the projected image 300, after which additional images are acquired by the observing cameras 204. The process of altering the projected image 300 can be repeated as many times as necessary to obtain the point density needed for image processing at the required level of accuracy.

The dynamic nature of the light projector 202 enables the processing system 200 to utilize image processing techniques to remove interfering light sources from images acquired by the cameras 204. One image can be taken with a pattern projected onto the surface, and a subsequent image can be taken with the projected pattern turned off. If the second image is subtracted from the first image, in the resulting difference image, light sources which are common to both images (i.e., background illumination) are removed. Optionally, the processing system 200 may process the individual images to reduce the illumination intensity at the locations(s) in the pattern that are producing saturation in the image.

Figure 5A:
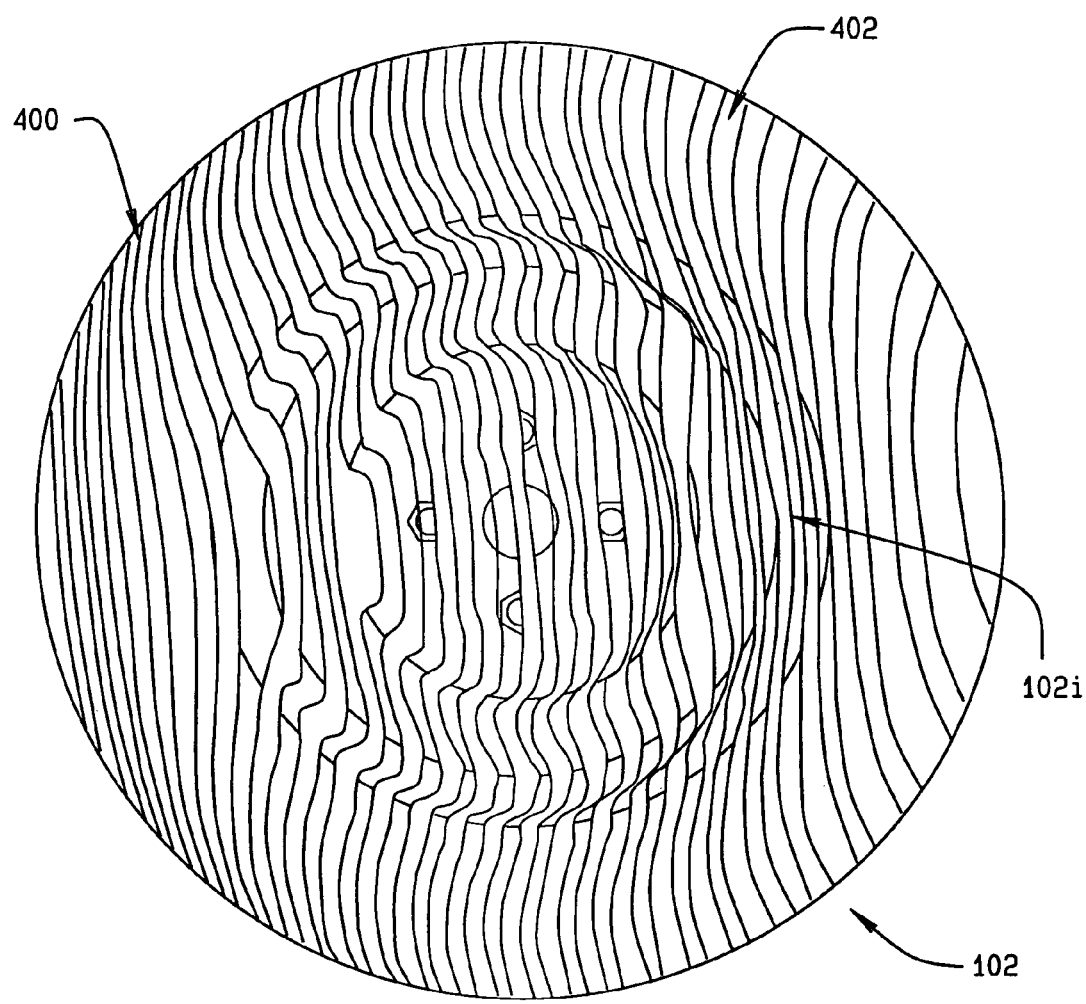
FIG. 5A is a perspective view of a vehicle wheel assembly surface onto which a pattern of closely spaced uniform parallel lines has been projected.
Figure 5B:
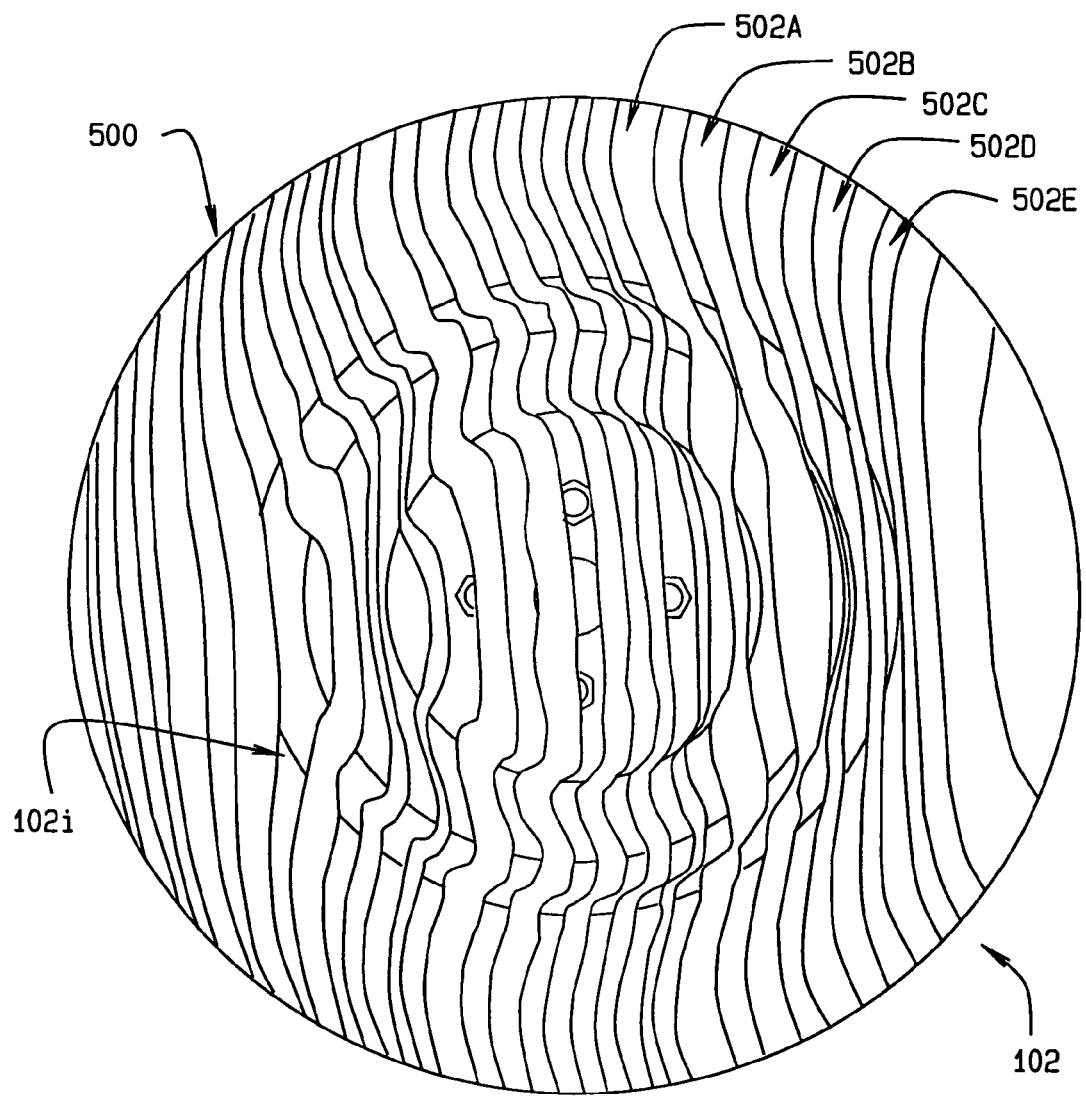
FIG. 5B is a perspective view of a vehicle wheel assembly surface onto which a pattern of closely spaced parallel lines of varying thickness has been projected.

Those of ordinary skill in the art will recognize the advantages which may be achieved by utilizing the processing system 200 and light projector 202 to illuminate a surface with a variety of different patterns which are specifically adapted to facilitate the procedure at-hand. For example, selected patterns could reduce image processing burdens on the processor 200 by facilitating the identification of geometrically similar areas on the wheel assembly 102. A projected image pattern 400 of closely spaced uniform straight lines 402 such as shown in FIG. 5A, a projected image pattern 500 of closely spaced varying thickness straight lines 502A-502E such as shown in FIG. 5B, or the scanning of a single line across the object, facilitates the identification of flat areas on the surface of the wheel assembly 102. The straight lines 402 and 502A-502E will remain straight when they intersect a flat plane. The angle and spacing that the projected lines 402, 502A-502E make as they intersect the flat portion of the object can be used to identify areas of the object that are on the same plane. In one embodiment of the present invention, identification of a common plane is utilized to locate a flat area around the outside of the wheel rim of the wheel assembly 102 for further processing. Areas of an image which exhibit localized high curvature of the lines 402, 502A-502E may correspond to prominent features of the vehicle wheel assembly 102 such as a valve stem or wheel spoke, and may be used for subsequently tracking rotation of the vehicle wheel assembly 102. This same information can be gleaned if the projected image pattern consists of geometric shapes having straight sides.

In another use, a wheel rim and tire interface 102i of the wheel assembly 102 is initially identified by the processing system 200 using a flood illumination from the light projector 202. Image processing of images of the wheel assembly 102 under flood illumination established the type and location for a subsequent projected pattern that is expected to be most efficient for determining an accurate three-dimensional location of the wheel assembly 102 based on the geometry of the particular wheel rim and tire interface 102i. Given the vast combination of rims and tires possible in a wheel assembly 102, the interface 102i between them can have many configurations. Since each interface 102i may have a best pattern for analysis, the processing system 200 is configured with software adapted for choosing and generating a best-use projected pattern, including associated pattern element shapes, sizes, locations and colors. Those of ordinary skill in the art will recognize that the present application is not limited to utilizing the wheel rim and tire interface 102i for purposes of facilitating a projected image pattern selection, and that similar techniques may be implemented utilized other features of the vehicle wheel assembly 102, such as spoke configuration or rim size.

For example, some vehicle wheel assemblies 102 may have highly reflective or chromed surfaces which render the processing of acquired images difficult. A processing system 200 of the present invention can identify the highly reflective surfaces in the initial flood illumination of the wheel assembly 200, and can direct the light projector 202 to project the pattern onto the rubber tire close to the identified wheel rim and tire interface 102i, avoiding the need to process images of the highly reflective and/or chromed wheel rim surfaces. Optionally, the two-dimensional wheel rim and tire interface 102i boundary can be intersected with two-dimensional lines in the projected pattern, and the processor 200 may utilize a triangulation technique to produce accurate points in three-dimensional space up to the wheel rim edge.

Those of ordinary skill will recognize that the processing system 200 may be configured to utilize a wide variety of image processing algorithms for processing images acquired by stereoscopic camera pairs 204A and 204B such as shown in FIGS. 1A-1D. For example, one class of algorithms which may be used with stereo camera systems implements a "patch" matching process, instead of a point correspondence, to establish common fiducials within acquired images for triangulation. This technique is described in co-pending U.S. patent application Ser. No. 11/421,181 assigned to Hunter Engineering Co., which is herein incorporated by reference. Patch matching image processing algorithms use the properties of a small area of pixels from an image acquired by a first camera, and search for an area with the same or similar properties in an image acquired by a second camera. Since the search is based on the characteristics of an area in the images instead of on a single data point, the matching process is much more robust. Patch matching works best where texture is present on the surfaces being investigated. That is, it is preferable that the illumination intensity values in the images vary in a unique way over the patch area. A wheel assembly 102 can have large areas where the texture is the same, such as the black tire or areas of the wheel rim. By utilizing the light projector 202 to project a pattern onto the wheel assembly, areas of uniform texture can be utilized in image patch-matching techniques. For example, projecting a tightly packed random pattern of dots or other shapes onto the wheel assembly surfaces facilitates the use of advanced software techniques that require variation in the observed surface properties.

In an alternative embodiment of the present invention, the processing system 200 may be configured to utilize the light projector 202 to project patterns onto the vehicle wheel assembly 102 which aid in accurately measuring features that have been previously identified in images using techniques such as those described in U.S. Patent Application Publication No. 2005-0068522 A1, assigned to Hunter Engineering Company. Once a feature of the vehicle wheel assembly 102 or vehicle is identified, the processing system 200 directs the light projector 202 to shift a projected pattern across the feature in a raster manner, enabling processing of acquired images to locate the feature to a high degree of precision. Alternatively, the processing system 200 may direct the light projector 202 to modify the projected pattern to "fill" or illuminate the identified features and thus highlight the position of the feature to an operator as a visual indication or guide.

In an alternate embodiment, the processing system 200 may be configured with the image analysis software to direct the light projector 202 to operate in a servo mode. As previously stated, the projected image of a linear component such as a straight line directed at an object will deviate from a straight line where it intersects curves in the object. The processing system 200 may be configured to control the light projector 202 to dynamically alter the projected image in a controlled manner to provide the appearance of a straight line in an acquired image even though the projected line intersects a curved surface of the object. By controlling the manner in which the projected image is altered, a measure of the amount of deviation from the projection of a "straight" line which is required to achieve the appearance of a "straight" line in an acquired image may be determined by the processing system 200. The location of the projected image on the wheel assembly surface, and the amount of alteration in the "straight" line projection can be used by the processing system 200 to identify the local shape and position of the underlying object. By utilizing a series of projection corrected "straight" lines, the processing system 200 can fully define the contours and shape of an object such as a vehicle wheel assembly 102.

In an alternate embodiment, the processing system 200 is configured to utilize the light projector 202 to adjust the size and shape of an elliptical projected pattern to match a "flat" area adjacent the outside edge of a wheel rim. The processing system 200 may be configured to modify coefficients of the equation for the projected elliptical pattern until the fit with the observed wheel rim feature in images acquired by the cameras 204 reaches an acceptable error threshold.

Figure 6:
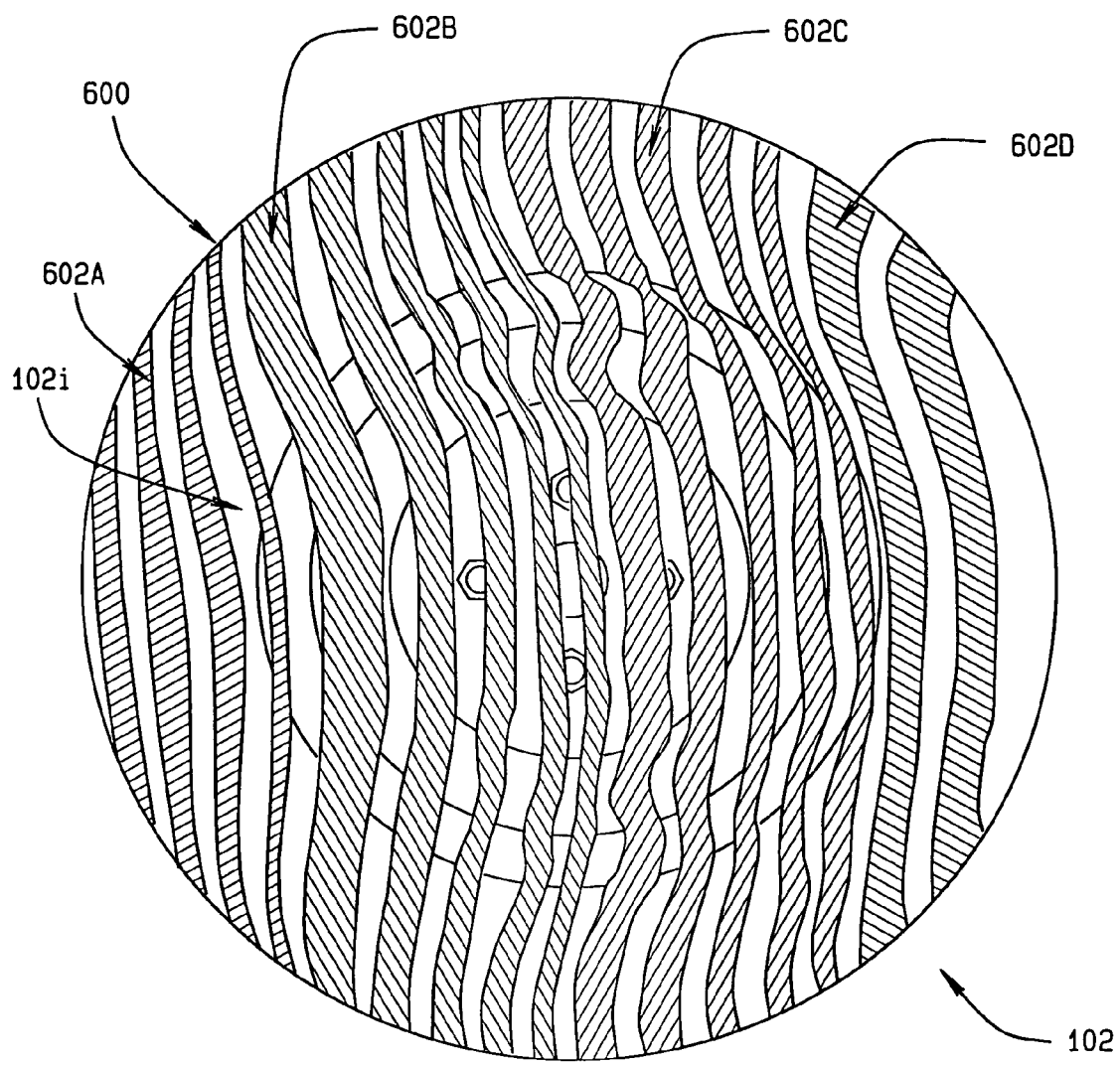
FIG. 6 is a perspective view of a vehicle wheel assembly surface onto which a color pattern of lines has been projected.

In an alternate embodiment, the processing system 200 is configured to utilize a light projector 202 and cameras 204 which are capable of projecting and observing colored patterns. The use of projected color patterns 600, such as shown in FIG. 6, facilitates the coding of projected patterns as different features, such as lines 602A-602D within the projector field of view, and correspondingly in the acquired images, can have different colors. Stereo point correspondence may be verified by the color components in images acquired by two cameras 204A and 204B. This technique decreases false point matches, and increases accuracy. Alternatively, the light projector 202 could be configured to illuminate the same projected pattern with a sequential sequence of colors, such as the three primary colors. Processing of sequential images enables the processing system 200 to identify the proper color mix for optimum illumination of the wheel assembly 102 by subsequent pattern projections. The optimum illumination color may vary over different portions of the wheel assembly 102, and may be used by the processing system 200 to direct the light projector 202 to separate wheel rim areas from tires, or colored lettering from a background, etc. thus helping to identify regions of interest for future analysis.

Figure 7:
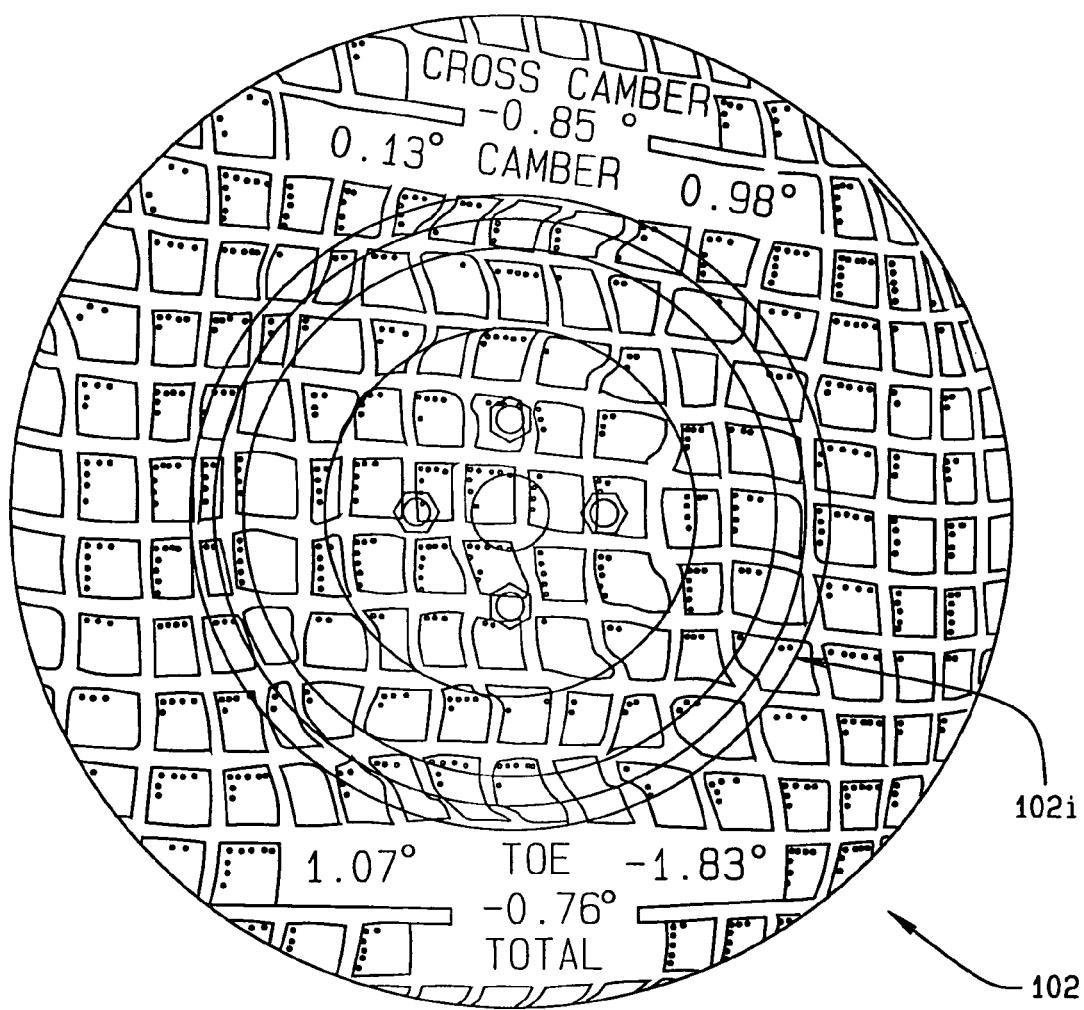
FIG. 7 is a perspective view of a vehicle wheel assembly surface onto which a pattern and alignment angle data has been projected.

Those of ordinary skill in the art will recognize that a vehicle wheel alignment system having a processing system 200 and a light projector 202 may be beneficially used for other purposes in addition to measurement of the vehicle wheel assembly 102. For example, the processing system 200 may be configured utilize the light projector 202 to provide a visual display of information to an operator during a vehicle service procedure. As shown in FIG. 7, calculated wheel alignment angles and/or other information can be projected with or without the measurement pattern, directly onto a surface of a vehicle wheel assembly 102. Alternatively, a copy of the information displayed on a vehicle service system display unit could be displayed on a side panel of the vehicle or other surface, while the measurement pattern is directed toward the wheel.

A vehicle wheel alignment system configured as described above in connection with FIGS. 1A-1D may be utilized to carry out a wide range of vehicle wheel alignment procedures. An exemplary procedure for determining an axis of rotation of a vehicle wheel assembly 102, and thus the alignment of the vehicle wheel assembly 102 is set forth below.

First, with the vehicle in place on the runway 104 so that the steered wheels are initially at the center of a set of turn plates, the processing system 200 utilizes associated light projectors 202 to flood each wheel assembly 102 with light having no projected pattern. Camera pairs 204A and 204B associated with each vehicle wheel assembly 102 acquire stereo images of the illuminated wheel assemblies 102, which are processed to locate one or more prominent features, such as wheel studs, valve stems, cutouts in the wheel, or lettering on the tire. These prominent feature(s) are subsequently used as rotation indices in order to track rotation of the wheel assemblies 102.

Second, the light projectors 202 are utilized to illuminate the wheel assemblies 102 with a coded projected pattern. The projected pattern can consist of lines, squares, triangles, pentagons, hexagons, ellipses, dots, etc, such as shown in FIGS. 4-6. The purpose of the projected pattern is to provide a dense grid of fiducial marks for use in stereo triangulation. These marks may be vertex points such as line intersections, corners, or centroids of dots or ellipses. The processing system 200 identifies three-dimensional points on the wheel assemblies 102 by stereo triangulation of the observed fiducial points. After the first exposure of the projected pattern, the projected pattern is shifted by the light projector 202, and a second set of three-dimensional points is triangulated from acquired images by the processing system 200. The process is repeated until a point cloud representing each observed wheel assembly 102 is sufficiently dense enough to obtain the desired level of accuracy in measurements.

Third, the point cloud data for each wheel assembly 102 is fit by the processing system 200 to a parametric model or a set of geometric primitives representing all of, or parts of, the associated wheel assemblies 102. This technique is described in co-pending U.S. patent application Ser. No. 11/421,181 assigned to Hunter Engineering Company. An axis of symmetry and an associated pointing direction for each wheel assembly 102 are derived from the position and orientation of a best fit parametric model or geometric primitive. The axis of symmetry represents the axis of rotation only if the wheel assembly 102 is geometrically perfect. Otherwise, the axis of symmetry will be displaced from the axis of rotation due to wheel runout and compensation will be required to identify the true axis of rotation.

Next, once the processing system 200 has established an initial pointing direction for the axis of symmetry of each wheel assembly 102, and associated rotation indexes are identified and their relationships established, the operator is prompted by the processing system 200 to roll the vehicle in a selected direction. The axis of symmetry for each wheel assembly 102 is assumed to undergo only translational movement while the associated rotation index undergoes a translation plus rotation movement. The illumination and image acquisition/processing steps of the process are repeated as the vehicle is rolled. The axis of symmetry, along with the associated rotation index for each vehicle wheel assembly 102 is tracked, allowing the processing system 200 to calculate the amount of wheel rotation and translation. The processing system prompts the operator to stop rolling the vehicle once a sufficient amount of wheel rotation is achieved.

Following the roll, illumination and image acquisition/processing steps are repeated, and a new pointing direction for the axis of symmetry is calculated for each vehicle wheel assembly. With two pointing directions for the axis of symmetry, and a known amount of rotation, the processing system 200 may calculate the position of the axis of rotation for each wheel assembly 102 with respect to the associated axis of symmetry.

Finally, the operator is prompted by the processing system 200 to return the vehicle wheel assemblies 102 to the center of their respective turn plates. Steps 1 through 3 are again repeated when the vehicle has come to rest. Various alignment angles for each observed wheel assembly 102 are then calculated based on the known position of the axis of rotation of each wheel assembly 102 with respect to the associated axis of symmetry. Preferably, the processing system 200 is configured to provide active tracking of the rotation index and to continually repeat steps 1 through 3, so that live adjustments to vehicle wheel alignment angles by an operator, and live steering angles can be displayed during subsequent procedures or alterations.

Those of ordinary skill in the art will readily recognize that the present invention is not limited to use in vehicle wheel alignment or service systems 100 configured with stereoscopic camera pairs 204A and 204B. In alternate embodiments, shown in FIGS. 2A-2D and 3A-3D, the processing system 200 is configured to utilize one camera 204 and one light projector 202 per vehicle wheel assembly, arranged in a spatial relationship similar to the spatial relationship of a stereo camera pair. The light projector 202 is directed by the processing system 200 to project a dynamic pattern onto the associated vehicle wheel assembly 102. Images acquired by the camera 204 of the projected patterns are then analyzed by the processing system 200 to determine the relationship of the wheel assembly 102 to the camera 204, and subsequently the alignment angles of the vehicle wheels. In embodiments utilizing a single camera 204 in combination with a light projector 202, it is necessary to perform a camera-to-projector calibration.

With the embodiments shown in FIGS. 2A-2D or 3A-3D, to transform a point in projector space to a point in camera space, the following transformation may be used by the processing system 200:

$$\begin{bmatrix} X_c \\ Y_c \\ Z_c \\ 1 \end{bmatrix} = \begin{bmatrix} R & \cdot & \cdot & T \\ \cdot & \cdot & \cdot & \cdot \\ \cdot & \cdot & \cdot & \cdot \\ 0 & 0 & 0 & 1 \end{bmatrix} \begin{bmatrix} X_p \\ Y_p \\ Z_p \\ 1 \end{bmatrix}$$

where:

$X_p$, $Y_p$, and $Z_p$ are points in projector space;

$X_c$, $Y_c$, and $Z_c$ are points in camera space;

R is the 3×3 rotation matrix for angular alignment of the projector and camera spaces, established by calibration; and T is the 3×1 translation vector for superimposing the origins of the rotated projector coordinate system and the camera coordinate system, established by calibration.

When using a light projector 202 which initially generates the projected pattern on a display device, coordinates on the display device are designated $U_p$, $V_p$. The image is then projected through a lens on the display device having a focal length $f_p$, and intersects the vehicle wheel assembly surface at $X_p$, $Y_p$, $Z_p$.

The projection equations for such a light projector 202 are:

$$\frac{U_p}{f_p} = \frac{X_p}{Z_p} \quad \text{and} \quad \frac{V_p}{f_p} = \frac{Y_p}{Z_p}$$

$U_p$, $V_p$, and $f_p$ are known quantities, therefore the ratios $$\frac{X_p}{Z_p} \quad \text{and} \quad \frac{Y_p}{Z_p}$$

are known.

The well known equations for a pinhole camera model are:

$$\frac{U_c}{f_c} = \frac{X_c}{Z_c} \quad \text{and} \quad \frac{V_c}{f_c} = \frac{Y_c}{Z_c}$$

where $U_c$ is the horizontal coordinate of a pixilated imager, $V_c$ is the vertical coordinate of the imager, and $f_c$ is the camera focal length. The values of $U_c$, $V_c$, and $f_c$ are known quantities, therefore the ratios $$\frac{X_c}{Z_c} \quad \text{and} \quad \frac{Y_c}{Z_c}$$

are known.

The wheel assembly 102 or any point on the surface of the wheel assembly 102 is an unknown distance from the light projector 202 and the camera 204, making $Z_p$ and $Z_c$ unknowns. These quantities can be solved through an iterative process:

1. Assume a value for $Z_p$.
2. Calculate $X_p$ and $Y_p$ using the projection equations:

$$X_{p1} = \frac{U_p Z_{p1}}{f_p} \text{ and } Y_{p1} = \frac{V_p Z_{p1}}{f_p}$$

3. Transform the assumed point into camera coordinates using:

$$\begin{bmatrix} X_{c1} \\ Y_{c1} \\ Z_{c1} \\ 1 \end{bmatrix} = \begin{bmatrix} R & \cdot & \cdot & T \\ \cdot & \cdot & \cdot & \cdot \\ \cdot & \cdot & \cdot & \cdot \\ 0 & 0 & 0 & 1 \end{bmatrix} \begin{bmatrix} X_{p1} \\ Y_{p1} \\ Z_{p1} \\ 1 \end{bmatrix}$$

where the addition of the "1" to the subscript indicates the first iteration.

4. Project the $X_{c1}, Y_{c1}, Z_{c1}$ coordinates to the camera image plane and solve for $U_{c1}, V_{c1}$ using:

$$U_{c1} = \frac{X_{c1} f_c}{Z_{c1}} \text{ and } V_{c1} = \frac{Y_{c1} f_c}{Z_{c1}}$$

5. Determine the error of the assumption by solving:

$$E_1 = (U_c - U_{c1})^2 + (V_c - V_{c1})^2$$

6. Iterate using a minimization routine such as Levenburg-Marquardt until the error is at a minimum.
7. Once $Z_p$ is properly estimated, $X_c, Y_c$, and $Z_c$ are calculated.

The processing system 200 can construct an array of points on the wheel assembly 102, creating a point cloud for the vehicle wheel assembly 102. The point cloud can then be analyzed by the processing system 200 for fitting to a parametric model. Parts of the point cloud may be used by the processing system 200 to fit a geometric primitive shape such as a ring or circle. The orientation of the model or geometric primitive when fit to the data of the point cloud corresponds to the orientation of the wheel assembly 102 from which the point cloud was generated.

While the light projector 202 for use with the present invention has been described above as being either monochromatic or polychromatic (i.e. able to project color images), it will be recognized that the present invention is not limited to use with a specific configuration of light projector. For example, in an alternate embodiment the light projector 202 may be configured to project a pattern onto a surface such as a vehicle wheel assembly 102 in a telecentric manner. With a telecentric projection, a projection of a two-inch square would appear to be two inches per side regardless of the distance between light projector 202 and the wheel assembly surface 102. The processing system 200 may be configured to utilize a predetermined size of the projected image in determining the distance of an object such as the vehicle wheel assembly 102 with respect to an observing camera 204.

Alternatively, the light projector 202 may be configured to "sweep" or raster a projected light spot across an area to project an illuminated pattern. A light sensor associated with the processing system may be utilized to measures a time-of-flight for light from the projector 202 to the object surface and back to the camera sensor. This enables the processing system 200 to generate additional three-dimensional points using range information calculated from the time-of-flight readings at discrete times, where the direction of the light beam is also known at each time. These points are from the interior of the shapes comprising the pattern and supplement the three-dimensional points calculated from the edges of these shapes using triangulation. More three-dimensional points can produce better accuracy, but additionally enable the processing system 200 to reject misidentified shapes in the pattern even if using a lower cost, lower accuracy range measurement apparatus. These three-dimensional range points can also be generated more densely than line intersections, allowing surface curvature and tilt to be calculated by the processing system 200.

While the present invention has generally been described in the context of projecting an image onto the surface of a vehicle wheel assembly 102, it will be recognized that the processing system 200 can be configured to utilize the light projector 202 in combination with at least one imaging sensor or camera 204 to project a pattern visible to the imaging sensor or camera onto a portion of the vehicle itself. The distinctive light pattern preferably contains one or more easily recognizable features, such as the corners of squares, or intersections of lines, which may be precisely resolved by standard image processing algorithms. The pattern is altered, and images taken with each alteration to generate a point cloud of data used to identify the location of the vehicle portion onto which the pattern is projected.

Figure 9:
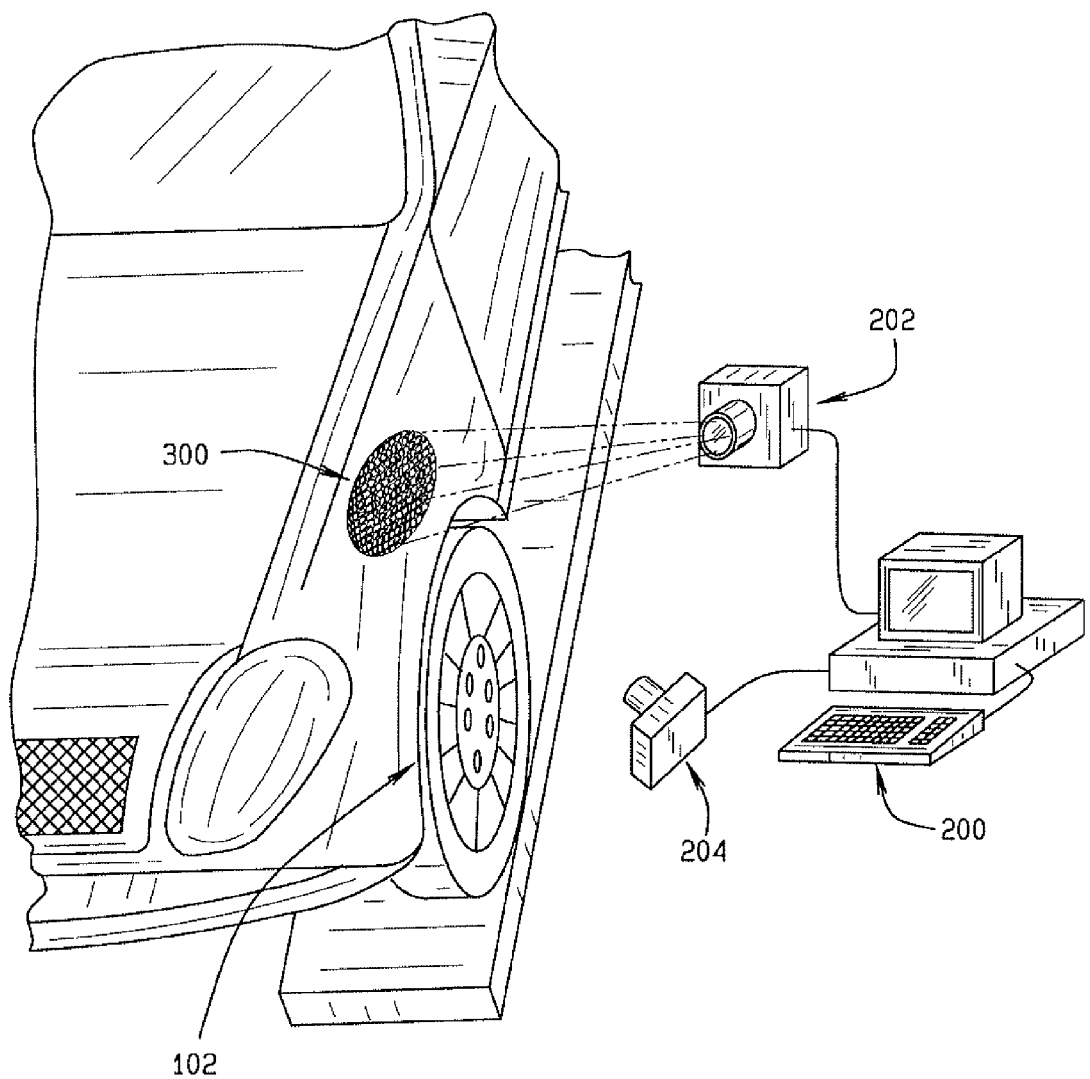

For example, a vehicle ride height may be measured utilizing the above-described embodiment. By projecting a pattern onto the vehicle body in proximity to the top portion of each vehicle wheel assembly 102, as shown in FIG. 9, a point cloud of data can be generated by the processing system 200 which is representative of the vehicle body surface. The measurements obtained from the point cloud data at each of the vehicle wheel locations is subsequently utilized to determine the ride height of the vehicle in a static configuration, i.e. with the vehicle stationary, and in a dynamic configuration, i.e. as the vehicle is moved such as through a steering of the steerable wheels or a rolling movement.

Optionally, the vehicle service system of the present invention may be configured to project a light pattern onto a vehicle support surface such as a runway or lift rack. By observing and processing the projected light pattern on the vehicle support surface as previously described in the context of vehicle components, the projected light pattern may be used to identify the location of the lift rack onto which the pattern is projected.

For example, a lift rack height may be measured utilizing the above-described embodiment. Lift racks typically have an identifiable vertical edge. By projecting a light pattern onto the lift rack vertical edge, a point cloud of data can be generated by the processing system 200 which is representative of the location of the lift rack edge surface. The measurements obtained from the point cloud data at each of the vehicle wheel locations may be subsequently utilized to determine the lift rack height and/or orientation in a static configuration, i.e. with the lift rack stationary, and in a dynamic configuration, i.e. as the lift rack is moved such as raising the lift rack to get access to the adjustment point on the vehicle. Identification of the lift rack height may optionally be used to adjust the height of the observing imaging sensors in relationship to a vehicle disposed on the lift rack, while the lift rack orientation may be utilized in a determination of vehicle wheel alignment angles.

While the present disclosure has been described in the context of a vehicle wheel alignment system, it will be recognized that the present disclosure may be utilized in the context of other vehicle service systems, such as vehicle wheel balancers and vehicle tire changers, which may benefit from the ability to acquire spatial information associated with a vehicle component such as a wheel assembly.

For example, a vehicle wheel balancer traditionally measures lateral and radial runout of a vehicle wheel rim with a mechanical arm containing a sensor which measures movement in the lateral and radial direction. Using the present disclosure, a vehicle wheel balancer may be configured with an image projection system to project a pattern onto the side of the wheel assembly or the wheel rim, and to use the resulting images to obtain measurements of lateral and radial runout. In a vehicle wheel balancer application, proper placement of an imbalance correction weight on a vehicle wheel assembly is important. Using the present disclosure, a vehicle wheel balancer may be configured to highlight an area on the surface of a vehicle wheel assembly for guiding placement of an imbalance correction weight, as well as to acquire a measure of rim profile, spoke location, existing weight locations, and valve stem location.

A tire changer could also benefit from the present disclosure. As with a vehicle wheel balancer system, measurements of the wheel rim radial runout are useful during a tire changing operation, such as to match a high spot on a wheel rim with a low spot of an associated tire. Optionally, a tire changer system may be configured to utilize the present disclosure to facilitate identification of a wheel rim and tire interface to facilitate automated position of a tire bead breaker mechanism.

Figure 8:
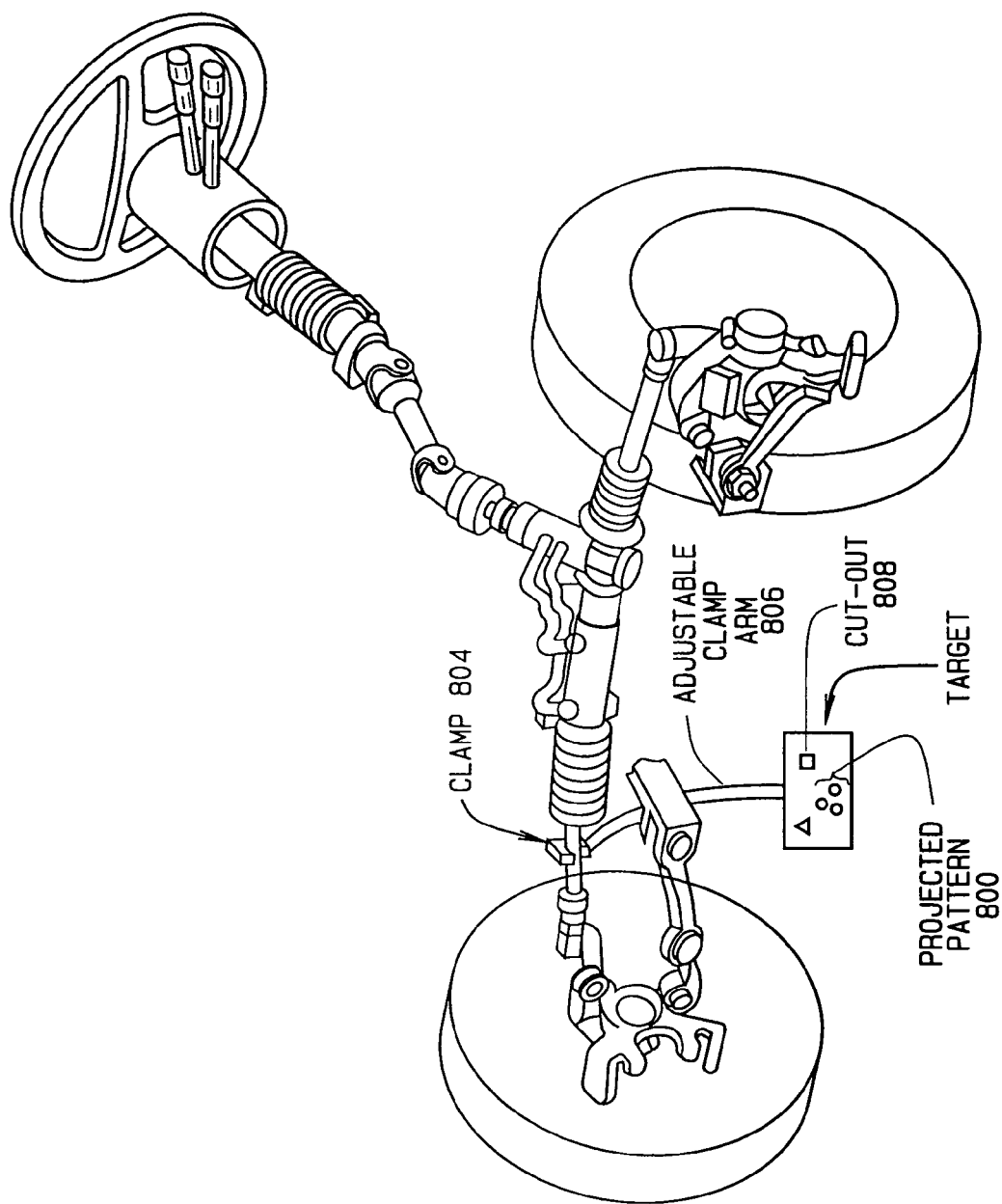
FIG. 8 is an illustration of a projection surface secured in a fixed relationship to a vehicle component; and, FIG. 9 illustrates the projection of an image onto a portion of a vehicle surface.

For some applications, the surfaces of the vehicle wheel assembly 102 or vehicle may not be suitable for direct projection of an illuminated pattern. An alternate embodiment of the present invention, shown in FIG. 8, provides a processing system 200 which is configured to utilize a light projector 202 with at least one camera or imaging sensor 204 to project an observable pattern 800 onto a removable target surface 802 which is attached to, or in contact with, an object such as a vehicle component. The distinctive pattern 800 projected onto the target surface 802 preferably contains one or more easily recognizable features, such as the corners of squares, or intersections of lines, which may be precisely resolved by standard image processing algorithms. The projected pattern 800 may be altered, and images taken with each alteration, to generate a point cloud of data used to identify the location of the target surface 802 onto which the pattern 800 is projected.

For example, the movement of individual vehicle components could be observed during a vehicle steering procedure. As shown in FIG. 8, a clamp 804 having an adjustable clamp arm 806 onto which is secured the target surface 802 may be secured to a vehicle component, such as the steering rack or tie rod. During a vehicle steering procedure, the location of the steering rack or tie rod relative to the steered vehicle wheel location is measured using a point cloud of data generated from images of alternating patterns 800 projected onto the target surface 802 secured to the vehicle component.

Optionally, the target surface 802 onto which the patterns 800 are projected may include features which facilitate processing the observed images. For example, a flat surface with at least one geometric pattern cut out 808 of the target surface 802 facilitates the image processing by the processing system 200 because the projected patterns 800 illuminating the target surface 802 will clearly identify the geometric pattern, and which may be used to identify the location and orientation of the target surface 802.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A vehicle service system having a processing system configured with image processing software and vehicle service software, comprising:

a light projector configured to project at least one light pattern onto a surface associated with a vehicle, said light pattern including at least one geometric shape having a plurality of identifiable vertex points;

at least one imaging sensor operatively coupled to said processing system and configured to acquire an image of said projected light pattern on said surface;

wherein said processing system is configured to identify said vertex points within image data received from said at least one imaging sensor; and wherein said processing system is configured to utilize said identified vertex points to determine at least one parameter associated with said surface.

2. The vehicle service system of claim 1 wherein said surface is associated with a vehicle body panel; and wherein said parameter is a vehicle ride height measurement.

3. The vehicle service system of claim 2 wherein said surface is removably coupled to said vehicle body panel.

4. The vehicle service system of claim 1 wherein said surface is associated with a vehicle wheel assembly; and wherein said at least one parameter is associated with at least one vehicle wheel alignment angle.

5. The vehicle service system of claim 1 wherein said light pattern includes at least one component of data for visual display to an operator.

6. A vehicle service system having a processing system configured with image processing software and vehicle service software, comprising:

a light projector configured to project at least one light pattern onto a surface associated with a vehicle component other than a vehicle wheel, said vehicle component selected from a set of vehicle components including a steering system component and a suspension system component;

at least one imaging sensor operatively coupled to said processing system and configured to acquire an image of said projected light pattern on said surface; and wherein said processing system is configured to utilize image data received from said at least one imaging sensor to determine a measurement associated with said vehicle component.

7. The vehicle service system of claim 6 wherein said surface is removably coupled to said vehicle component.

8. The vehicle service system of claim 6 wherein said at least one measurement represents a spatial position of said vehicle component.

9. The vehicle service system of claim 6 wherein said at least one measurement represents a spatial orientation of said vehicle component.

10. A vehicle service system having a processing system configured with image processing software and vehicle service software, comprising:
   a light projector configured to project at least one light pattern onto a surface associated with a vehicle, said light pattern including at least one geometric shape having at least one identifiable edge and further including at least one component of data for visual display to an operator;
   at least one imaging sensor operatively coupled to said processing system and configured to acquire an image of said projected light pattern on said surface;
   wherein said processing system is configured to identify said edges within image data received from said at least one imaging sensor; and
   wherein said processing system is configured to utilize said identified edges to determine at least one parameter associated with said surface.

11. The vehicle service system of claim 10 wherein said component of data for visual display to an operator includes at least one alphanumeric symbol.

12. A vehicle service system having a processing system configured with image processing software and vehicle service software, comprising:
   a light projector configured to project a light pattern onto a surface associated with a vehicle, said light pattern having a known configuration;
   at least one imaging sensor operatively coupled to said processing system and configured to acquire an image of said projected light pattern on said surface;
   wherein said processing system is configured to compare said acquired image of said projected light pattern with said known configuration of said light pattern during an iterative procedure for altering said projected light pattern, said processing system continuing said iterative procedure until said acquired image of said projected light pattern matches said known configuration of said light pattern to within a tolerance; and
   wherein said processing system utilizes a measure of said alteration of said projected light pattern to identify a parameter of said surface.

13. The vehicle service system of claim 12 wherein said surface is associated with a vehicle wheel assembly.

14. The vehicle service system of claim 12 wherein said parameter of said surface includes a spatial orientation of said surface.

15. The vehicle service system of claim 12 wherein said parameter n of said surface includes a spatial position of said surface.

16. The vehicle service system of claim 12 wherein said known configuration of said light pattern includes at least one linear component; and wherein said measure of said alteration of said projected light pattern includes a representation of curvature of said linear component in said projected light pattern.

17. A machine-vision vehicle wheel alignment system including a processor configured with vehicle wheel alignment software and image processing software, comprising:
   a light projector configured to project a light pattern onto a surface associated with a vehicle;
   at least one imaging sensor operatively coupled to said processing system and configured to acquire an image of said projected light pattern on said surface;
   wherein said processing system is configured to select an initial light pattern for projection onto said surface from a set of light patterns; and
   wherein said processing system is further configured to select at least one subsequent light pattern for projection onto said surface responsive to an evaluation of said acquired image of said initial projected light pattern.

18. The machine vision vehicle wheel alignment system of claim 17 where said initial light pattern is a flood illumination of said surface.

19. The machine vision vehicle wheel alignment system of claim 18 wherein said at least one subsequent light pattern is selected to facilitate measurement of at least one parameter of said surface from an acquired image of said subsequent light pattern projected onto said surface.

20. The machine vision vehicle wheel alignment system of claim 17 wherein said processing system is configured to select at least one subsequent light pattern responsive to characteristics of said surface identified from said evaluation of said acquired image of said initial projected light pattern.

21. The machine vision vehicle wheel alignment system of claim 17 where said initial light pattern contains more than 1 color.

22. The machine vision vehicle wheel alignment system of claim 17 where said imaging sensor is configured to obtain distance information for each pixel.

23. A vehicle service system including a processing system configured with vehicle service software and with image processing software, comprising:
   a light projector configured to project at least one light pattern onto a vehicle wheel assembly, said at least one light pattern including a plurality of image components each having an associated identifying code;
   at least one imaging sensor operatively coupled to said processing system and configured to acquire an image of said projected light pattern;
   wherein said processing system is configured to utilize said acquired image and at least one visible image component having an associated identifying code to determine at least one parameter associated with said vehicle wheel assembly.

24. A method for determining a vehicle measurement parameter for use with a vehicle service system having a processing system configured with image processing software and vehicle service software, comprising:
   projecting at least one light pattern onto a surface associated with a vehicle, said at least one light pattern having a plurality of features, said plurality of features including a plurality of identifiable vertex points;
   acquiring an image of said projected light pattern on said surface;
   processing said acquired image to identify at least a portion of said plurality of features within said acquired image;
   utilizing said portion of identified features to determine at least one parameter associate with said surface; and storing, in an electronic memory, a representation of said at least one parameter.

25. The method of claim 24 wherein said plurality of features further include at least one identifiable edge.

26. The method of claim 24 wherein said surface is associated with a vehicle wheel assembly; and wherein said at least one parameter is associated with at least one vehicle wheel alignment angle.

27. A vehicle service system having a processing system configured with image processing software and vehicle service software, comprising:
- a light projector configured to project at least one light pattern onto a surface associated with a vehicle, said light pattern including a plurality of geometric shapes each having at least one identifiable edge, said plurality of geometric shapes selected from a set of shapes including curvilinear lines and polygons, and wherein each plurality of geometric shapes includes an identifying code;
- at least one imaging sensor operatively coupled to said processing system and configured to acquire an image of said projected light pattern on said surface;
- wherein said processing system is configured to identify said edges within image data received from said at least one imaging sensor; and
- wherein said processing system is configured to utilize said identified edges to determine at least one parameter associated with said surface.

* * * * *